Aug. 26, 1930.  J. LEDWINKA  1,773,818

METHOD OF ASSEMBLY OF PRESSED METAL AUTOMOBILE DOORS

Filed June 13, 1928  2 Sheets-Sheet 1

INVENTOR.
JOSEPH LEDWINKA.
BY
*John R. Tarbox*
ATTORNEY.

Aug. 26, 1930.   J. LEDWINKA   1,773,818
METHOD OF ASSEMBLY OF PRESSED METAL AUTOMOBILE DOORS
Filed June 13, 1928   2 Sheets-Sheet 2

INVENTOR.
JOSEPH LEDWINKA.
BY
John P. Tarbox
ATTORNEY.

Patented Aug. 26, 1930

1,773,818

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

METHOD OF ASSEMBLY OF PRESSED-METAL AUTOMOBILE DOORS

Application filed June 13, 1928. Serial No. 284,938.

The invention relates to a method of assembly of all metal doors and particularly to a method of assembly of such doors made from pressed metal, as shown, for example, in an application Serial No. 230,703, filed by applicant for automobile door, November 3, 1927.

The door according to this application is made in the main, by relatively few stampings, namely four, as follows, an outer panel stamping and inner panel stamping, and two stampings extending around the window opening and forming the glass run channel structure or frame.

It is an object of my invention to provide a method of assembly for doors of this class which reduces the number of joining operations, and which produces a door built up out of relatively thin gauge sheet metal stampings, which is very strong, durable and rigid and not likely to develop looseness of joints or other defects common in composite doors after a period of use.

I attain this object by forming the parts with such marginal conformations that they may be readily joined together largely by crimping operations aided by relatively few spot welding operations. The order in which the parts are joined together also contributes to ease of handling in moving them from operation to operation and in jigging them on the operations for the work to be performed thereon. The method of joinder by crimping the edge of one part over the adjacent edge of the other does away in large part with numerous welding operations necessary in practical all steel doors of prior construction. The production of the door almost wholly of four main stampings, of course, also greatly reduces the number of joining operations, and the smoothing and polishing operations which are in some cases a necessary requiring, where joining by welding is largely resorted to.

In the accompanying drawings is shown a method of assembly of a door of the class described made up of but four main stampings.

In these, Fig. 1 shows the two stampings forming the glass run channel structure extending around the window opening in unassembled relation.

Figure 4:
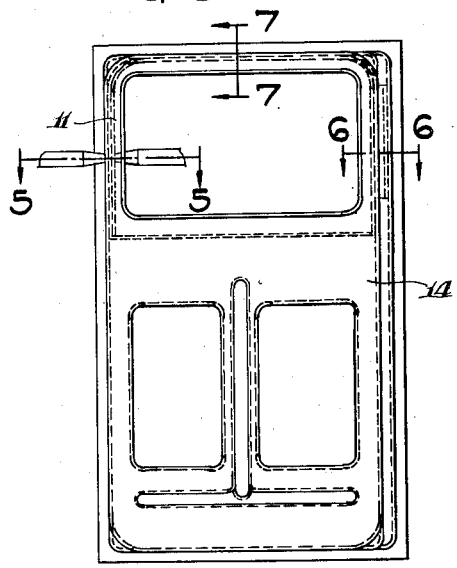
Fig. 4 shows the second stage of the assembly in which inner panel stamping is combined with the glass run channel structure shown in Fig. 2.
Figure 7:
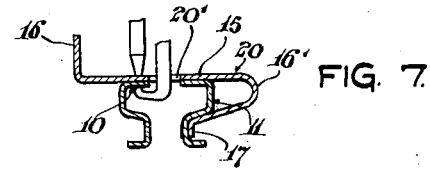
Figure 5:
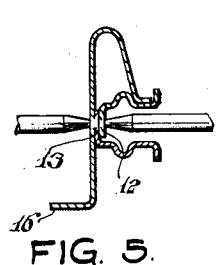
Figure 6:
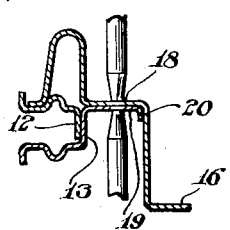

Figs. 5, 6 and 7 are detail sectional views taken, respectively, on the lines 5—5, 6—6 and 7—7 of Fig. 4 showing the method of joining of the inner panel stamping with the glass run channel unit by spot welding.

Figure 8:
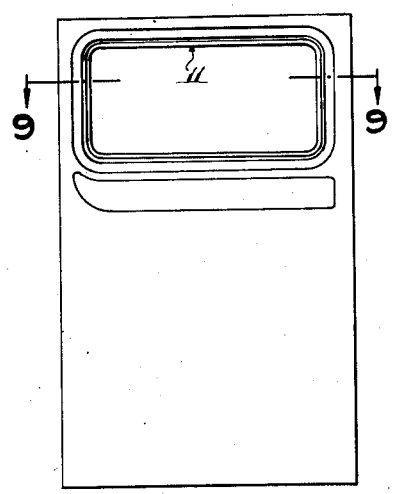

Fig. 8 represents the unit shown in Fig. 4 and the outer panel brought together for assembly, as seen from the outside.

Figs. 9, 10, 11, 12, 13 and 14 are sectional views taken along the line 9—9 of Fig. 8 showing various stages of the assembly operation between the outer and inner panels and the glass run channel unit.

Figure 15:
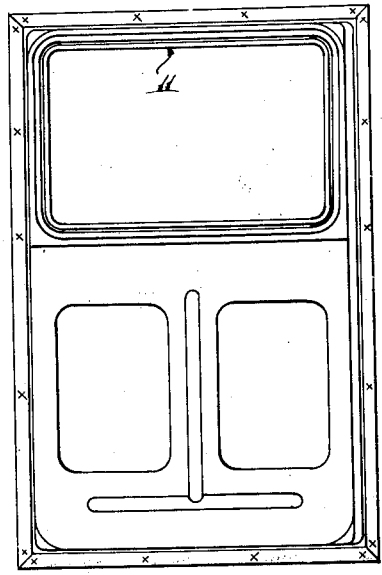

Fig. 15 is an inside view of the completely assembled door.

Figure 1:
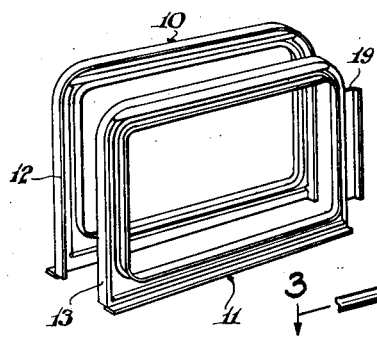
Figure 2:
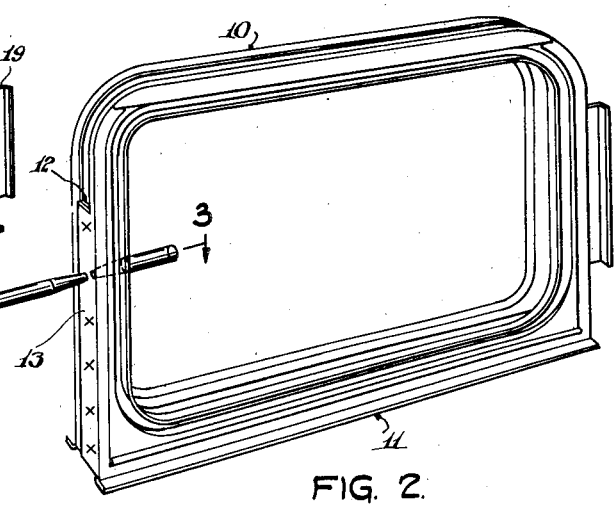
Fig. 2 shows them assembled to form the glass run channel structure, and indicating the method of assembly by spot welding.
Figure 3:
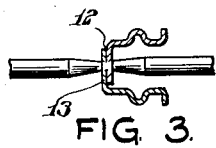
Fig. 3 is a detail sectional view on the line 3—3 of Fig. 2.

In the door assembled by the novel method of assembly of my invention, the glass run channel structure is built up of two unitary stampings 10 and 11 each extending completely around the window opening. The inner stamping 10 is formed at the sides with transverse flanges 12 and the outer stamping 11 has corresponding flanges 13. When the parts 10 and 11 are brought together, as in a suitable welding jig, the flanges 12 and 13 overlap each other and are then readily joined by spot welding operations, as clearly indicated in Figs. 2 and 3.

The inner panel stamping 14 which forms in addition, the transverse jamb rail 15 of the door provided at its outer edge with a transverse door overlap flange 16 and the garnish beading 16' extending around the inner edge of the window opening, is formed around said opening with a flange 17 extending substantially parallel to the plane of the door. At the lock side of the door, the transverse jamb face portion of the door is formed with an offset intermediate its edges providing a shoulder portion 18. The outer stamping 11 of the glass run channel structure is provided on the lock side with a flange 19 having an edge flange 20, flange 19 being adapted to be joined to portion 18 when the parts are brought together, as in an assembly jig, to the positions shown in Figs. 4 to 7, inclusive. The combined structure 10, 11 and the inner panel stamping 14 are so conformed, as will be readily apparent from the above referred to figures, that they nest with each other and one falls right into the other when they are brought together. When so nested and locked in nested relation, as in a jig, they are joined by spot welding at the hinge side, as indicated in Fig. 5, through the bottom of the glass run channel 12, 13 and the transverse jamb rail portion 15 of the inner panel; at the lock side, as indicated in Fig. 6 through the portions 18 and 19 and at the top, where the transverse jamb rail portion of the inner panel is slotted, as at 20′, to permit the insertion and removal of a sliding window glass and the upper channel-section portions of inner and outer glass run stampings 10 and 11 are spaced the width of this slot and face toward each other, by spot welding the upper side walls of the channels to the transverse jam rail portion 15 of the inner panel. This can readily be accomplished by having one of the electrodes hook-shaped, as shown in Fig. 7, and entered through the slot 20′, with its hook shaped end engaging the inside of the channel side wall of the glass run structure in opposed relation to an outer electrode.

It will be noted that all the welding operations are rendered easily accessible and performable by reason of the general openness of the joints made possible by this method of assembly, and furthermore, the joining operations are made in places where the weld marks do not appear in places where they are normally visible, so that no special operations are needed to efface the marks.

Figure 9:
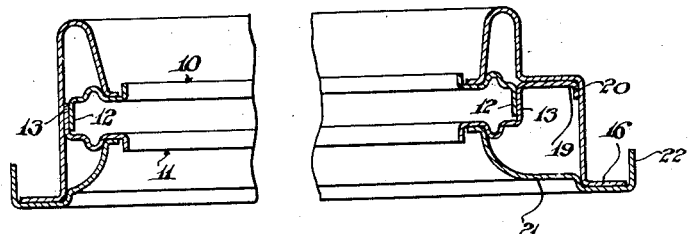
Figure 10:
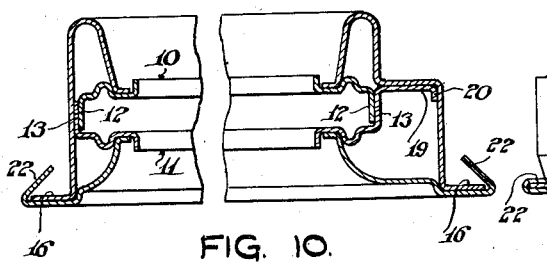
Figure 11:
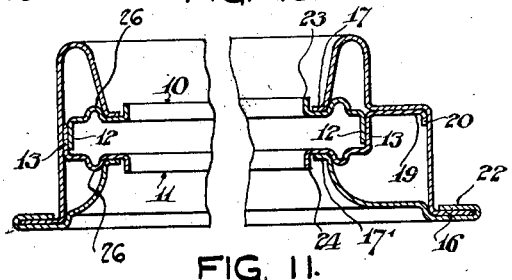

After the inner panel stamping has been so joined to the glass run channel 10, 11 by spot welding, the sub-assembly unit so formed is brought into assembled relation with the outer panel stamping 21 in the manner shown in Figs. 8 and 9, as in a suitable assembly jig. In this relation, the outer edge flange 16 of the inner panel stamping seats within the angle formed by the body of the outer panel stamping and a transversely extending peripheral flange 22. The peripheral portions of the outer and inner panels are then readily oined by simply crimping down the flange 22 on the one over the flange 16 of the other as indicated in Figs. 10 and 11, Fig. 10 showing the flange 22 turned down at a 45° angle just prior to the final crimping operation in which it is firmly crimped down upon the flange 16, as shown in Fig. 10. This crimping operation may be performed in a single operation all around the door or in a succession of operations, but preferably, in order to reduce the number of operations, in a suitable die press at a single operation.

Figure 14:
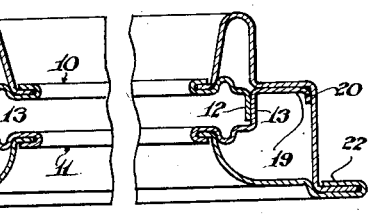

The crimped joinder may be reinforced by an additional spot welding of the crimped together flanges at a few spots as indicated by the weld marks in Fig. 15 and the showing in Fig. 14. This welding may be done before or after the operations joining the inner and outer panels to the glass run unit at the margin of the window opening.

Figure 12:
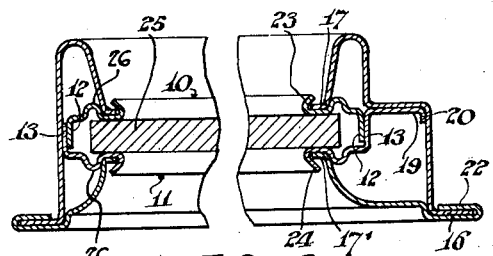
Figure 13:
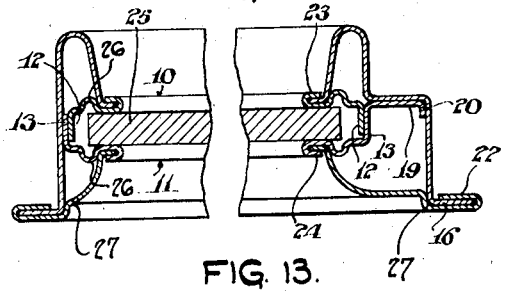

The joinder of the outer and inner panels to the glass run channel frame is effected by a crimping operation in which the laterally extending flanges 23 and 24, which are extended around the window opening on the inner and outer stampings 10 and 11, respectively, of the glass run channel structure, are crimped over the adjacent and corresponding flanges 17 and 17′ on the outer and inner panels, respectively. This operation is represented in two stages in Figs. 12 and 13, in the first stage, the flanges 23 and 24 are turned down through approximately 45° as indicated in Fig. 12, and are then finally crimped down upon the flanges 17 and 17′ in the final stage, as shown in Fig. 13. It will be understood that a suitable backing die as 25 is inserted in the glass run to support the joints from the inside during the crimping operations. These crimping operations may be performed in successive operations, or preferably, by a single die pressing operation.

The steps of crimping are facilitated and a very secure locked crimped joinder is effected by the fact that shoulders 26 are formed in the glass run channel stampings 10 and 11 and these aid in positioning the parts in assembly and cooperate with the crimped down edges 23 and 24 of the stampings 10 and 11 in securely locking the edges of the crimped together parts against relative movement. A similar shoulder 27 with a similar function is provided adjacent the outer periphery of the outer panel to provide a more secure joinder between the outer and inner panels.

While the particular method of door assembly described herein have proven very rapid and efficient in operation, and one which results in a very strong, durable door although made of relatively light gauge sheet metal stock, it will be understood that the number of operations and the order of steps may be varied somewhat in ways which will be evident to those skilled in the art, and I desire to include such variations within the scope of my invention as expressed in the appended claims:

What I claim and desire to secure by Letters Patent is:

1. The method of assembly of sheet metal doors having a window opening therein, comprising the assembly first of two opposed stampings extending around the window opening to form the window glass run, and the subsequent assembly therewith and with each other of inner and outer panel stampings also extending around the window opening to form the complete door.

2. The method of assembly of sheet metal doors having a window opening therein, comprising the assembly by welding of two opposed stampings extending around the window opening to form the window glass run, the subsequent partial assembly of said window glass run with an inner panel stamping, and the final complete assembly of said inner panel stamping with the glass run and an outer panel stamping, the outer panel stamping being also joined to the glass run in said final assembly.

3. The method of assembly of sheet metal doors having a window opening therein comprising the assembly first of two opposed stampings to form a window glass run extending around the window opening, and thereafter assembling with said window glass run, an inner panel stamping also extending around said opening.

4. The method of assembly of sheet metal doors having a window opening therein comprising the assembly of two opposed stampings each extending entirely around the window opening to form a glass run unit extending entirely around the window opening, and the subsequent assembly therewith of inner and outer panel stampings also extending entirely around the window opening by crimping together the adjacent edges of the outer and inner panels and said glass run unit in the margins of said opening.

5. The method of assembly of sheet metal doors having a window opening therein and comprised of inner and outer panels and a glass run structure, each extending completely around the window opening, consisting in the joining of the glass run unit to the inner panel by crimping in the margins of the window opening, and by welding in their outer margins, and the joining of the outer panel to the glass run unit also by crimping in the margins of the window opening, and to the inner panel by crimping in the outer margins of the panels.

6. The method of assembly of sheet metal doors having a window opening therein, and comprising a unitary panel stamping forming one side of the door and having a transversely extending jamb face portion and a glass run channel stamping of angular form in section both extending around the window opening, which consists in joining said panel and glass run channel stamping by crimping their adjacent edges together entirely around the margins of the window opening and the jamb face portion of the panel to an arm of said angular glass run channel stamping.

7. The method of assembly of sheet metal doors having a window opening therein and comprising a unitary panel forming one side and the transverse jamb faces of the door, and a glass run channel stamping both extending around the window opening, which consists in joining said panel and glass run channel stamping by crimping their adjacent edges in the margins of the window opening one over the other, and in joining the outer margin of said glass run channel stamping to the transverse jamb face portion of the panel stamping, as by welding.

In testimony whereof I hereunto affix my signature.

JOSEPH LEDWINKA.